April 27, 1954   D. L. LAWSON   2,676,830
KITCHEN UTENSIL
Filed Aug. 18, 1952
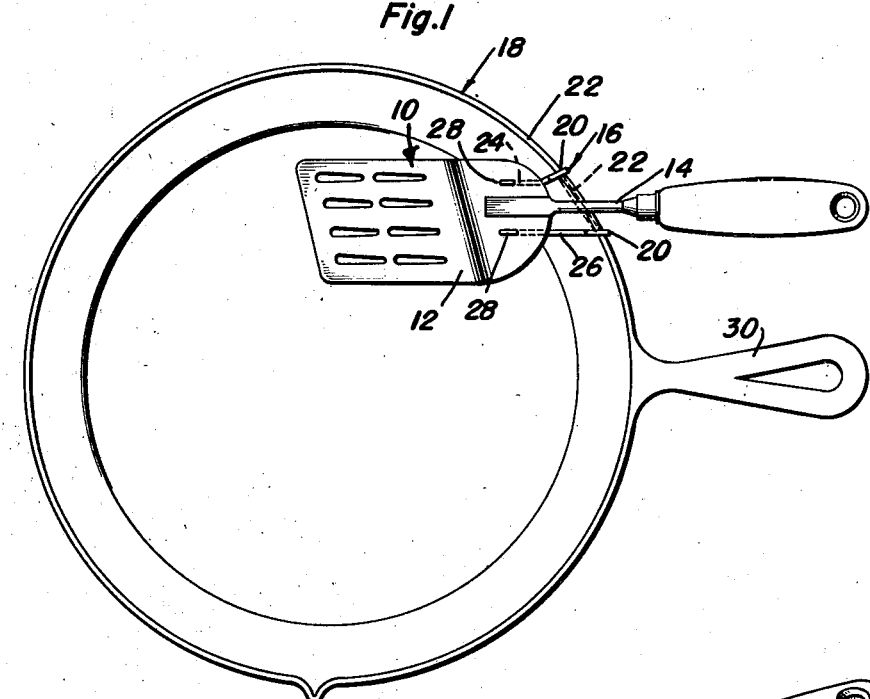
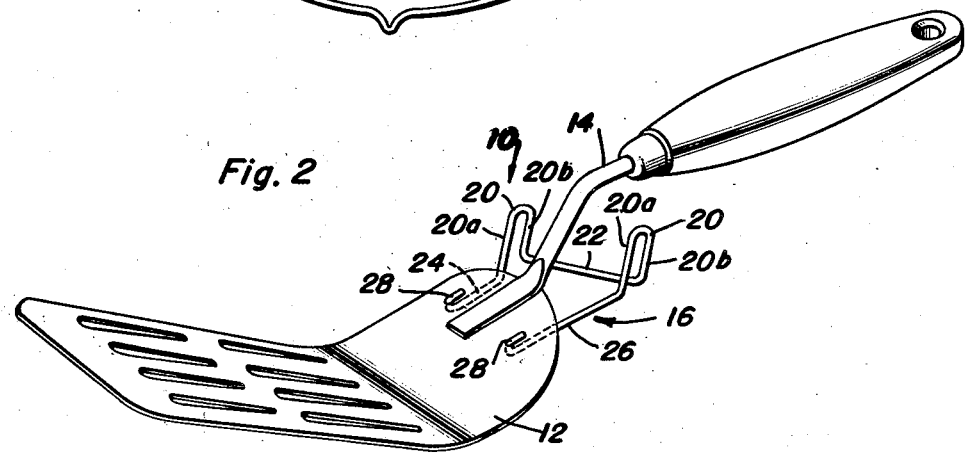
Daniel L. Lawson
INVENTOR.

Patented Apr. 27, 1954

2,676,830

UNITED STATES PATENT OFFICE 2,676,830

KITCHEN UTENSIL

Daniel L. Lawson, Los Angeles, Calif.

Application August 18, 1952, Serial No. 304,988

3 Claims. (Cl. 294—7)

This invention relates to new and useful improvements and structural refinements in kitchen utensils, particularly utensils such as a spatula, a fork, etc., which are used in conjunction with a frying pan, and the principal object of the invention is to provide simple and efficient means whereby such utensils may be conveniently supported on the rim of the pan so that food may be sustained in a somewhat elevated position above the pan to facilitate drainage of grease.

The above object is achieved by the provision of a clip on the utensil to supportably engage the rim of the pan, the clip being so arranged that the utensil is supported at one side of the pan and does not interfere with the pan handle.

Some of the advantages of the invention reside in its simplicity of construction, and its efficient operation, and in its adaptability for use on utensils of different sizes and types.

With the above more important objects and features in view and such other objects and features as may become apparent as this specification proceeds, the invention consists essentially of the arrangement and construction of parts as illustrated in the accompanying drawings, in which:

Figure 1 is a top plan view of a utensil supported by the invention on a pan, and Figure 2 is a perspective view of the utensil and clip per se.

Like characters of reference are employed to designate like parts in the specification and throughout the several views.

Referring now to the accompanying drawings in detail, the general reference character 10 designates a conventional utensil, for example, a spatula, including a work engaging member or blade 12 and an elongated handle 14 extending outwardly therefrom.

The invention resides in the provision of a clip which is designated generally by the reference character 16 and is applied to the utensil 10 for the purpose of sustaining the same in position on a frying pan 18.

The clip 16 is preferably formed from a single length of resilient wire and includes a pair of spaced, inverted, U-shaped hangers 20 which are adapted to be seated on the rim 22 of the pan 18 and afford inner and outer legs 20a, 20b, respectively. The lower ends of the outer legs 20b are connected together by a transverse bar 22, while the lower ends of the inner legs 20a are provided with forwardly projecting limbs 24, 26. These limbs have angulated extremities 28 rigidly secured in suitable apertures provided in the member or blade 12 of the utensil 10.

It will be apparent from the foregoing that when the hangers 20 of the clip 16 are applied to the rim 22 of the pan 18, the utensil 10 will be effectively supported on the pan with the blade 12 thereof slightly spaced above the bottom of the pan, so that any food positioned on the blade may be effectively drained of grease.

It will be also noted that the limbs 24, 26 are of unequal length and that the two hangers 20 are disposed in a mutually staggered relation, so that the bar 22 is disposed at an oblique angle relative to the axis of the handle 14. This in conformity with the curvature of the rim 22 of the pan 18 so that the utensil may be disposed at one side of the pan with the handle 14 thereof in substantially parallel relation to the pan handle 30 to avoid any possible interference.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. The combination of a kitchen utensil including a work engaging member and an elongated handle extending therefrom, and a clip for attaching said utensil to the rim of a pan, said clip comprising a pair of inverted U-shaped hangers disposed in spaced relation and affording inner and outer legs, a transverse connecting bar extending between the lower ends of the outer legs of said hangers, and inwardly projecting limbs provided at the lower ends of the inner legs of the respective hangers, said limbs being secured to said work engaging member adjacent said handle, said hangers being relatively staggered and said connecting bar being disposed at an oblique angle relative to the axis of said handle.

2. The device as defined in claim 1 wherein said clip is formed in its entirety from a simple piece of resilient wire.

3. In a spatula comprising an elongated blade and a handle projecting from one end of the blade, a pair of inverted U-shaped hangers, each including inner and outer legs connected by a bight portion, the inner legs having their free end secured to the blade on opposite sides of the handle, a connecting bar extending between said hangers and connecting the free ends of the outer legs to one another, said inner legs of said hangers being of unequal length spacing the bight portions of said hangers an unequal distance from the end of the blade whereby the spatula may be suspended from the rim of a pan so that the spatula blade will lie chordally of the rim of the pan, and means connecting the free ends of said inner legs to said blade.

References Cited in the file of this patent
UNITED STATES PATENTS

| Number | Name | Date |
|---|---|---|
| 1,106,809 | Haverty et al. | Aug. 11, 1914 |
| 1,836,014 | Chamberlain | Dec. 15, 1931 |
| 2,551,877 | Ditto | May 8, 1951 |